Patented Apr. 21, 1925.

1,534,289

UNITED STATES PATENT OFFICE.

EUGÈNE TEPPET, OF GRENOBLE, FRANCE, ASSIGNOR TO THE FIRM OF ALBERT CHARPILLOZ, OF BEVILARD, SWITZERLAND.

PROCESS OF AND COMPOSITION OF MATTER FOR KILLING PLANTS.

No Drawing.   Application filed October 16, 1922.   Serial No. 594,995.

*To all whom it may concern:*

Be it known that I, EUGÈNE TEPPET, chemical engineer, a citizen of the Republic of France, residing at 21 Grande Rue, Grenoble, France, have invented certain new and useful Improvements in Process of and Composition of Matter for Killing Plants, of which the following is a specification.

My present invention relates to a process of and composition of matter for destroying plants, for instance, weeds growing in promenades, alleys, garden paths, park walks, public places, along roads and railroads, and in fact wherever it is desired to kill weeds or plants.

The essential feature of the process consists in the employment of a herbicide preparation containing sodium chlorate as its essential constituent. The sodium chlorate can be used alone or with other materials, and in the preferred embodiment of the invention it is most desirable to use the chlorate in solution in water or other suitable liquid. The solution can be of any desired concentration, but for the purpose of example of a diluted concentrate it is stated that a solution of about one per cent to 2% strength gives very satisfactory results. This solution is sprinkled on the weeds and the ground containing the weeds, preferably in amount sufficient to moisten the ground somewhat, in order that the root system of the weeds can take up the solution containing the chlorate. While I have above referred to the sodium chlorates being used alone, it is stated that the following mixture has been found to give very satisfactory results, namely, 29 parts of sodium chlorate, one part of sodium bi-chromate and 20 parts of sodium carbonate, preferably together with enough water to dissolve the same. Instead of the sodium compounds mentioned, the potassium compounds can also be used.

Tests have shown that the use of the chlorate, as above indicated, is capable of completely and quickly destroying all kinds of plants and especially weeds and other perennial plants of small or medium size (as distinguished from bushes and trees).

While the product, as above stated, in a solid state can be sprinkled upon the ground in which the weeds are growing, the preferred mode of operation is to apply the material in a liquid state, the plants being watered with the solution containing the chlorate.

Sodium chlorate is the kind of chlorate which is cheapest under present manufacturing conditions. Sodium chlorate in aqueous solution is non-corrosive of metal and protects metal against corrosion and leaves the metal bright. Sodium chlorate when dry is a high explosive and therefore, when shipped, should be shipped moist. Sodium chlorate is an oxidizing agent and an aqueous solution of sodium chlorate, when used as a weed killer, probably has an oxidizing effect on plant constituents. The varieties of chlorates which are practical for weed killing, provided their expense is sufficiently low, are the chlorates which have a toxic effect on plant life and a non-toxic or non-injurious effect on animal life and do not corrode the jet orifices of spraying apparatus, when and if the weed killer is sprayed by use of such apparatus. It is noted that some plants are killed by merely sprinkling their tops with a suitable weed killer, while other plants grow from their roots or bulbs after their tops have been killed by a weed killer.

I have found it important, therefore, in study of the commercial and practical problem to discover a sprayable solution which is fatal to weed and plant life, which is non-poisonous to cattle, which does not corrode metal and consequently does not clog up or cause corrosion of the walls of the jet orifices, which is sufficiently cheap to meet actual commercial requirements, and which does not require the use of an animal repellent as a covering for it. And I have discovered that an aqueous solution, preferably of sodium chlorate and water, meets the required conditions of low cost, toxic effect on plants and weeds, non-toxic effect on cattle and that it is free from objectionable odor and does not corrode metal. It appears from chemical, microscopic and biological considerations and from the practical results heretofore obtained from the spraying of plants with my aqueous solution of sodium chlorate whereby the foliage, stems, stalks, ground about the roots and the roots of the plants are subjected to the effect of the chlorate, that the chlorate element effects a peculiar and positive toxic action in interaction with the life-giving constituents of the plants. The concentrated or saturated solution is for shipment. The weaker liquor of from about one per cent upwards is for application to plants as a herbicide.

I claim:

1. A process of destroying weeds by subjecting the same to contact with a herbicide containing a chlorate which is non-corrosive of metal, non-toxic to animals and toxic to weeds; and in thereby causing the weeds to absorb the thereto toxic chlorate.

2. A process of destroying weeds by applying to the same a solution containing sodium chlorate.

3. The hereinbefore described composition of matter for use as a weed killer, the same comprising an aqueous solution of a chlorate forming a sprayable liquid non-poisonous to animals and non-corrosive of metal, the said chlorate being in an amount to have a toxic effect on growing weeds and being a herbicide when in contact with weeds.

4. The hereinbefore described composition of matter for use as a weed killer, the same comprising an aqueous solution of sodium chlorate forming a sprayable liquid non-poisonous to animals and non-corrosive of metal, the said sodium chlorate being in an amount to have a toxic effect on growing plants and being a herbicide when in contact with weeds.

5. The hereinbefore described composition of matter, the same comprising in aqueous solution approximately twenty-nine parts of sodium chlorate, one part of sodium bichromate, and twenty parts of sodium carbonate.

6. The hereinbefore described composition of matter for use as a weed killer, the same being an aqueous solution of sodium chlorate of from about one per cent minimum strength to a higher per cent strength.

EUGÈNE TEPPET.

Witness:
JULIAN CEMBLE HUECHEZ.